(12) United States Patent
Jönsson

(10) Patent No.: US 7,035,118 B2
(45) Date of Patent: Apr. 25, 2006

(54) CONTROL MEANS FOR A TRANSISTOR SWITCH CIRCUIT

(76) Inventor: Ragnar Jönsson, Kyrkobacksvägen 5, SE-271 95, Ystad (SE)

( * ) Notice: Subject to any disclaimer, the term of this patent is extended or adjusted under 35 U.S.C. 154(b) by 78 days.

(21) Appl. No.: 10/472,337

(22) PCT Filed: Mar. 28, 2002

(86) PCT No.: PCT/SE02/00625

§ 371 (c)(1),
(2), (4) Date: Jan. 14, 2004

(87) PCT Pub. No.: WO02/080342

PCT Pub. Date: Oct. 10, 2002

(65) Prior Publication Data

US 2004/0130308 A1    Jul. 8, 2004

(30) Foreign Application Priority Data

Mar. 30, 2001    (SE) .................................... 0101126

(51) Int. Cl.
*H02M 3/335* (2006.01)

(52) U.S. Cl. ........................... 363/17; 363/37; 363/98; 323/283; 323/285

(58) Field of Classification Search ........ 323/282–285, 323/211, 119, 103, 222, 235; 363/16–17, 363/19, 37, 20, 39, 41, 95, 97, 98, 89, 132; 307/31, 35, 39, 151

See application file for complete search history.

(56) References Cited

U.S. PATENT DOCUMENTS 4,359,678 A * 11/1982 Raivola et al. ............. 323/211
4,768,216 A *  8/1988 Harvey et al. ............. 378/110
4,947,309 A *  8/1990 Jonsson ...................... 363/17
5,949,226 A     9/1999 Tanaka et al.

* cited by examiner

*Primary Examiner*—Rajnikant B. Patel
(74) *Attorney, Agent, or Firm*—Ladas & Parry LLP

(57) ABSTRACT

The invention relates to a control means for a transistor switch circuit controlling a power supply circuit for providing electric power to a load, comprising: a power supply stage having a transistor bridge circuit and an LC circuit with an inductor and filter capacitors, and a control stage. The control stage comprises a monitor circuit for monitoring a bridge voltage of a connection between two semiconductor members and the current through the inductor, said monitor circuit comprising a first comparator for comparing when the current through the inductor exceeds a reference value and a second comparator for comparing when the bridge voltage changes polarity towards the corresponding rail polarity; and a drive circuit adapted to provide a firing pulse to one of said switchable members of said semiconductor members for initiating the conduction thereof. The control drive circuit is adapted to terminate the conduction of said switchable member when said first comparator determines that the current through the inductor exceeds said reference value, and to provide another firing pulse when said second comparator determines that the bridge voltage changes polarity towards the corresponding rail polarity. According to the invention, a logic circuit is incorporated in the monitor circuit and connected to the outputs of first and second comparators, said logic circuit being adapted to respond to the first firing edge of a signal from the second comparator only, when the signal from the first comparator permits firing.

4 Claims, 5 Drawing Sheets

CONTROL MEANS FOR A TRANSISTOR SWITCH CIRCUIT

BACKGROUND OF THE INVENTION

1. Field of Invention

This invention relates to a special type of switch circuit for power electronics, intended to supply electric power to any type of load. The load may be an electric motor, an electric lamp, an electric loudspeaker or any other type of system that needs a controlled supply of voltage and current. The power level can be from less than a watt to hundreds of kilowatts. The direction of power flow can also be regenerative, i.e. from the load to the power supply. The major purpose of the special switch circuit is to supply controllable electric power with low electric losses in the switch circuit and with low electric noise at the input and output of the switch circuit.

The present invention discloses a means to avoid ringing in a control stage of the switch circuit.

2. Prior Art

The U.S. Pat. No. 4,947,309 "Method and Means for Controlling a Bridge Circuit" describes a special switch circuit. In the following, "switch circuit" refers to this special switch circuit. It is a classical bridge circuit, consisting of two transistor switches and two free-wheel diodes connected in series between a positive and a negative power bus. The bridge circuit is combined with an LC filter at the output of the transistor bridge plus a control circuit with a special switch sequence for controlling the bridge circuit. The primary purpose of the LC filter is to isolate the bridge current from the load current in such a way that the bridge current can go to zero during each switching cycle, while the load current is constant or approximately constant. Such a load current is typical for all applications with inductive load, for example an electric motor. Thanks to the LC filter and the special switch sequence it is possible to turn on the upper or lower transistor at zero transistor current and essentially zero transistor voltage. This eliminates the high electric stress and the electric losses that occur during turn on of conventional bridge circuits. A secondary purpose of the LC filter is to isolate the switching transients in the bridge circuit from the output of the switch circuit. Thanks to this it is possible to control high electric power with low electric noise at the output of the switch circuit.

The switch circuit is suitable for use in so called "frequency inverters" for control of electric AC motors. Then one switch circuit is needed for every motor phase. Only one switch circuit is described in the following.

During certain operating conditions the voltage waveform from the transistor bridge will have a high frequency ringing. A voltage comparator in the control circuit reacts on this voltage waveform and this may cause the upper or lower switch transistor to switch on and off several times. The present invention discloses a means to stop this extra switching by means of a logic circuit, which reacts only on the first voltage change during each switch cycle.

SUMMARY OF THE INVENTION

The present invention provides means for controlling a power supply circuit for providing electric power to a load, comprising: a power supply stage with a transistor bridge and an LC circuit with an inductor and filter capacitors, and a control stage for creating a special switch sequence without ringing.

Preferably, the power supply stage comprises an LC circuit with an inductor and filter capacitors and a bridge circuit including two semiconductor members connected in series between positive and negative power supply rails, each semiconductor member comprising a switchable member for conducting current to or from the load in the forward direction of the semiconductor member under control of a control drive circuit, and a free-wheel diode for conducting current in the opposite direction.

The control stage comprises a monitor circuit for monitoring the bridge voltage of the connection between the two semiconductor members and the current through the inductor, said monitor circuit comprising a first comparator for comparing when the current through the inductor exceeds a reference value and a second comparator for comparing when the bridge voltage changes polarity towards the corresponding rail polarity; and a drive circuit adapted to provide a firing pulse to one of said switchable members of said semiconductor members for initiating the conduction thereof; said control drive circuit being adapted to terminate the conduction of said switchable member when said first comparator determines that the current through the inductor exceeds said reference value, and to provide another firing pulse when said second comparator determines that the bridge voltage changes polarity towards the corresponding rail polarity.

According to the invention, a logic circuit is incorporated in the monitor circuit and connected to the outputs of the first and second comparators, said logic circuit being adapted to respond to the first firing edge of a signal from the second comparator only, when the signal from the first comparator permits firing.

BRIEF DESCRIPTION OF THE DRAWINGS

The invention is described in further detail below by means of a preferred embodiment of the invention and with reference to the appended drawings.

DETAILED DESCRIPTION OF THE PREFERRED EMBODIMENTS

Figure 1:
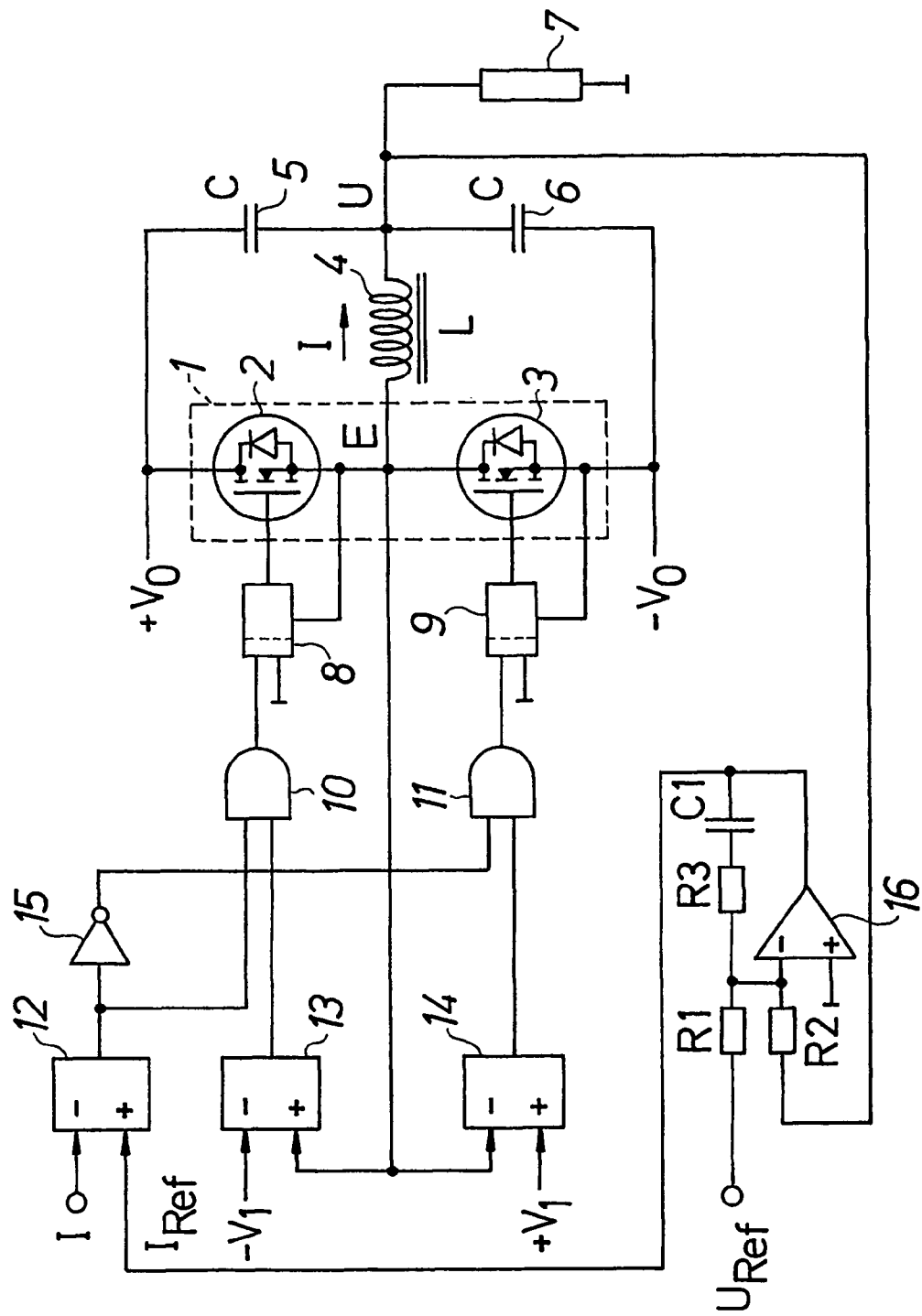
FIG. 1 is a circuit diagram of the switch circuit according to prior art.

FIG. 1 shows a circuit diagram of the switch circuit according to prior art. A bridge circuit 1 is created by two switch transistors 2, 3 connected in series between a plus bus +Vo and a minus bus −Vo. The two transistors in the diagram are of MOSFET type with free-wheel diodes integrated in the transistor structure. The diodes are shown inside the transistor symbols. If IGBT (Insulated Gate Bipolar Transistor) transistors are used instead of MOSFET transistors, separate free-wheel diodes must be connected in parallel with the transistors.

FIG. 1 shows a circuit with a positive and a negative supply voltage Vo, symmetrically centered around zero or ground level. Other configurations are possible.

The connection point between the two transistors is defined as the output of the transistor bridge 1, and an inductor 4 with the inductance value L is connected to this output. The other end of the inductor is connected to two filter capacitors 5 and 6, each with the capacitance value C, and this connection point is also the output to the load 7. For symmetry reasons the two filter capacitors are connected to the plus and minus bus, respectively. The LC circuit serves to isolate the transistor bridge from the load, and makes it possible to have a relatively constant current in the load while at the same time the inductor current changes between zero and maximum during each switch cycle.

This part of the circuit diagram represents the "power section", which handles large voltages and currents. The voltage from the bridge circuit is E and the output voltage to the load is U. The inductor current is I.

Drive circuits 8 and 9 that must be electrically isolated from each other are connected to the switch transistors. The drive circuits are controlled by signals from the AND gates 10 and 11. Some kind of electric isolation between the drive circuits 8 and 9 and the AND gates 10 and 11 is necessary, as is wellknown.

The switch circuit is controlled in a special "switch sequence" which is created by the logic control elements 10–15. First a positive switch sequence is described.

A complete switch cycle for positive output current starts with turn on of the upper switch transistor. The inductor current starts from zero and increases linearly in positive direction. At a controlled current level the transistor is turned off and the inductor current begins to decrease towards zero. Zero current is automatically detected and a new switch cycle can start. An equivalent switch cycle is used for negative output current.

A characteristic feature of the switch circuit is that turn on and turn off of the switch transistors are controlled by separate functions. Turn on is controlled by a voltage comparator. Turn off is controlled by a current comparator.

Two voltage comparators 13, 14 measure the voltage E from the output of the bridge circuit and compare it with two offset voltages −V1 and +V1. The output from comparator 13 goes high when the voltage E is higher than the offset −V1 and the output from comparator 14 goes high when the voltage E is lower than the offset voltage +V1. The outputs from the voltage comparators help to control the switch transistors and a high output permits that the switch transistors can be turned on. The two offset voltages −V1 and +V1 create a "window" around zero level, and when the bridge voltage E is inside this window both voltage comparators give a high output. The purpose of this window is only to facilitate the start of the switch circuit, and it has nothing to do with the switch sequence during normal operation.

A current comparator 12 compares a measured (or estimated) value I from the inductor 4 with a reference current value Iref. Iref is obtained by means of a voltage control circuit comparing the output voltage U at the load with a reference voltage value Uref which in turn is received from an external control device (not shown). Uref represents the desired load voltage and Iref represents the desired load current. The output from the comparator 12 is high as long as the measured value I is lower than the reference value Iref. A high value from the comparator output permits that the upper switch transistor 2 can be turned on.

The logic AND gate 10 combines the signals from voltage comparator 13 and current comparator 12 and controls the upper switch transistor 2. A high output from the AND gate 10 turns on the transistor.

Figure 2:
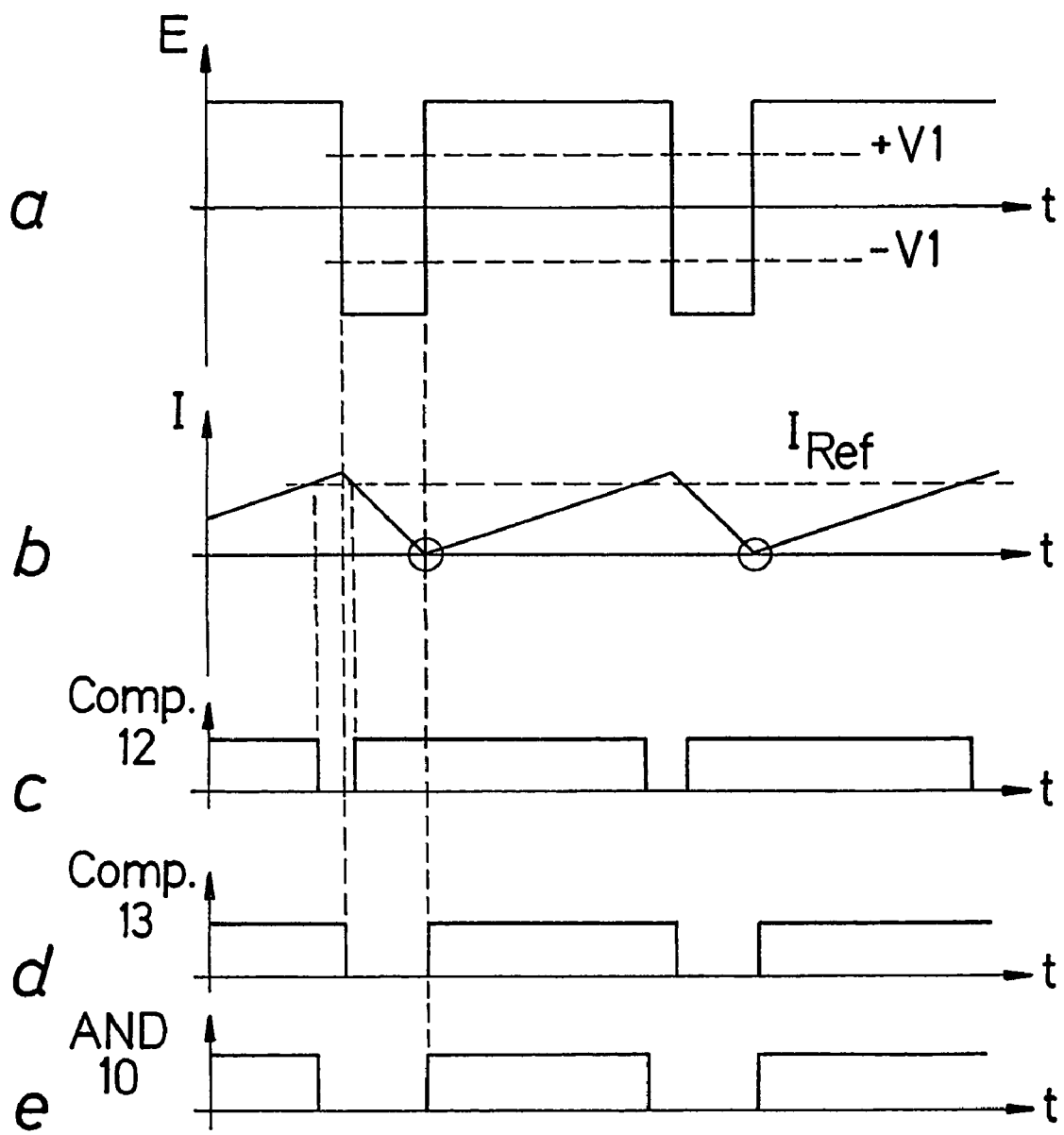
FIG. 2 is a time diagram of various signals appearing in the circuit of FIG. 1.

A complete switch sequence with positive output current will be described. The shape of the respective signals are shown in FIG. 2. The upper switch transistor 2 is turned on when both inputs to AND gate 10 are high. The bridge voltage E goes high. The current I through inductor 4 starts from zero and rises until it reaches the reference value Iref. In this moment the output from current comparator 12 goes low and this turns off the upper switch transistor 2 via AND gate 10. FIG. 2 shows a short time delay between the comparator signal and the transistor turn-off, caused by inherent delays in the drive circuit. The inductor current I cannot be turned off abruptly and finds a new way through the lower free-wheel diode in switch transistor 3. This forces the bridge voltage E to go low and the inductor current I starts to decrease. The output from current comparator 12 goes high as soon as the inductor current is below the reference value Iref, but now the output from voltage comparator 13 is low, and consequently AND gate 10 keeps the upper switch transistor 2 turned off.

The voltage across inductor 4 is now negative and this causes the inductor current to decrease until it is exactly zero. But the process doesn't stop there. The free-wheel diode inside the lower switch transistor 3 is still open and there is still a negative voltage across the inductor. This voltage starts to build up a negative inductor current (not shown in FIG. 2). This current flows through the lower free-wheel diode in "backward" direction and this is called a "reverse recovery current". Very soon the diode has received a "reverse recovery charge" and this turns off the diode. Again there is an inductor current which cannot be turned off abruptly. The current finds a new way through the free-wheel diode in the upper transistor 2. This forces the bridge voltage E to rise quickly, until it is clamped to the plus bus by the upper free-wheel diode. Then the inductor current begins to flow through the upper free-wheel diode to the plus bus. The "automatic" switch function created by the lower free-wheel diode takes place within the circled areas of FIG. 2b.

The quick voltage rise of the bridge voltage E is detected by voltage comparator 13 and now the logic signals are such that the logic AND gate 10 can turn on the upper switch transistor 2 for a new cycle.

It should be observed that only the upper switch transistor 2 is turned on during the complete switch cycle. A similar switch cycle can be generated via turn on of the lower switch transistor 3, this time resulting in a negative output current through the inductor 4. The only differences in the control logic are that the logic gate 15 reverses the output signal from current comparator 12, before it is connected to the logic AND gate 11, and the comparators 13 and 14 have different polarities.

The reference value Iref for inductor current determines if the upper or the lower switch transistor shall be turned on. The reference value can be generated from an external source.

Normally the switch circuit is combined with a feedback loop for voltage control. The output voltage U from the power stage of the switch circuit is fed back to a control amplifier 16 with the input resistors R1 and R2, a feedback resistor R3 and a feedback capacitor C1. The output voltage is compared with a reference voltage value Uref received from an external control device (not shown). The control amplifier amplifies the difference voltage and the output signal is used as reference value Iref for the inductor current.

The control amplifier 16 can be proportional and integrating (PI-type) as shown in the figure, but other solutions are possible. Also digital solutions in hardware or software are possible.

The output signal from the voltage control amplifier 16 (Iref) can also be used as a measure of the actual load current, which may be required by the external control device, e.g. a motor control system. This saves the cost of a separate current sensor. This is an important feature in low-cost motor control systems.

FIG. 2 shows a time diagram of a complete switch cycle with positive output current according to the description above. A typical fall time and rise time for the bridge voltage E is well below one microsecond, while a complete switch cycle can be 50 microseconds, typically.

Curve a shows the bridge voltage E with indication of the two comparator voltages +V1 and −V1. Curve b shows the measured inductor current I with indication of a positive reference current Iref. Curve c shows the output signal from current comparator 12. Curve d shows the output signal from voltage comparator 13. Curve e shows the output signal from AND gate 10. A similar set of curves can be drawn for a switch cycle with negative output current.

FIGS. 1 and 2 have described the switch circuit according to prior art.

The present invention relates to an improvement of the control system of the transistor switch circuit. At low power levels the energy content of the inductor 4 is low. Then it may happen that the transistor 2 or 3 is not turned on properly and the transistor bridge voltage E is clamped poorly to the respective supply voltage +V0 or −V0. Thus, an undesired high frequency ringing is obtained in the signal E. The voltage comparator reacts on the voltage waveform E from the transistor bridge. The ringing may cause the upper or lower switch transistor to switch on and off several times. This results in increased and unnecessary current consumption in the drive circuits. The present invention discloses a means to stop this extra switching by means of a flip-flop device, which reacts only on the first voltage change during each switch cycle.

Figure 3:
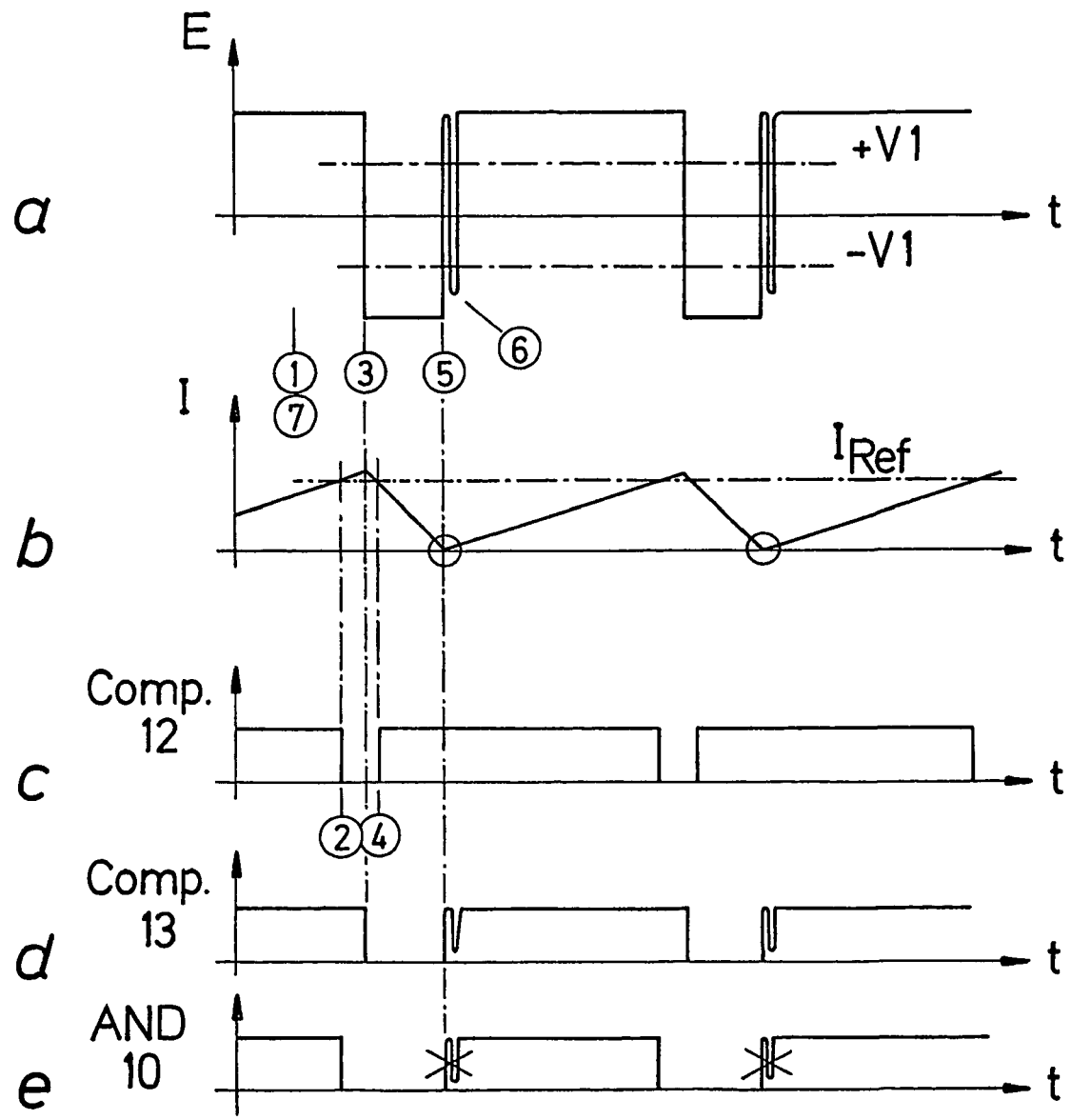
FIG. 3 shows a time diagram of signals appearing in the circuit of FIG. 1 with positive inductor current and ringing voltage waveforms.
Figure 4:
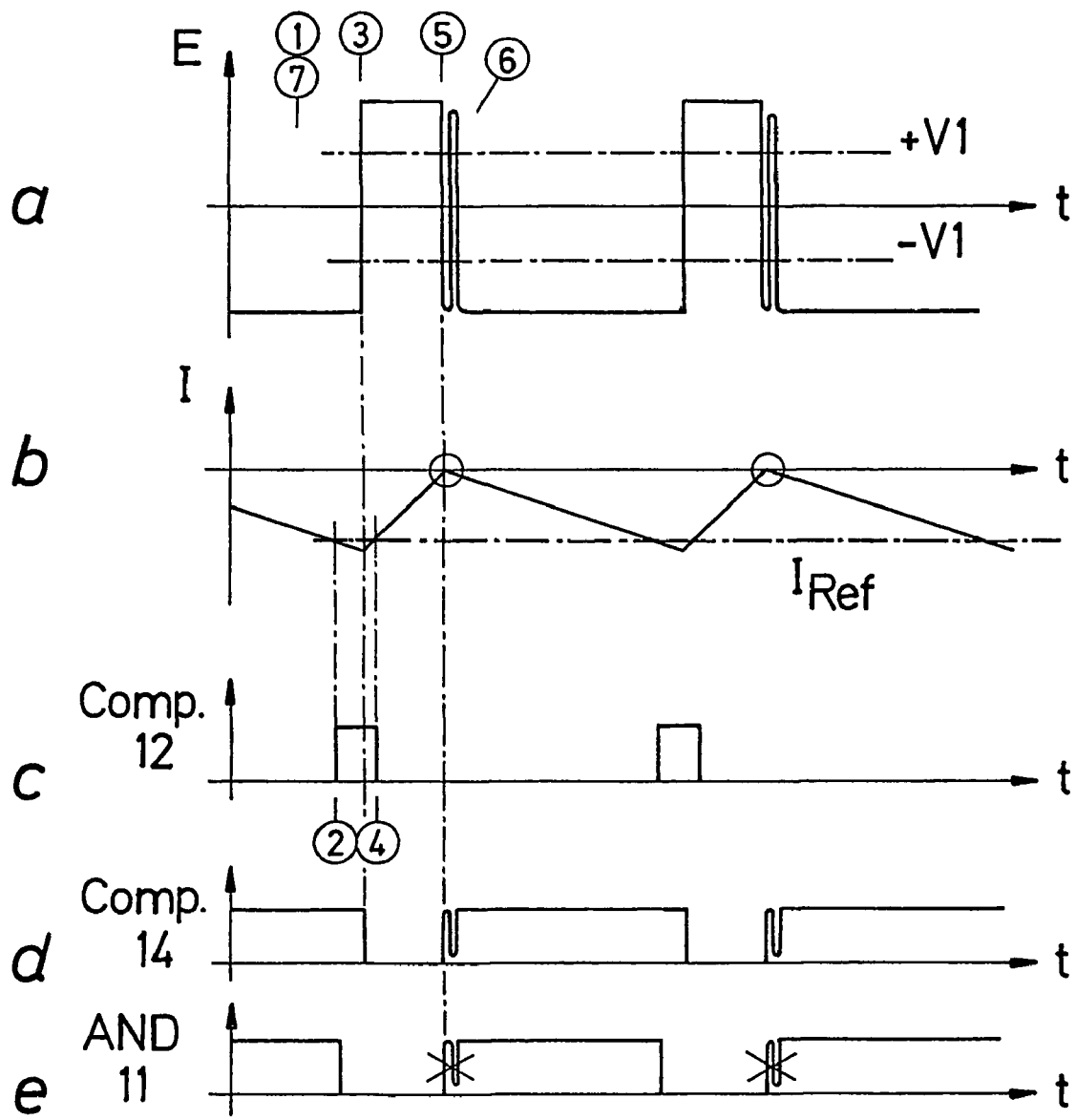
FIG. 4 shows a time diagram similar to FIG. 3 with negative inductor current.

FIGS. 3 and 4 show two different cases, with positive current and negative current, respectively. The ringing is shown in curves a, d and e.

FIG. 3 shows a case with positive inductor current. Curve b shows the inductor current I together with a reference current Iref. Curve c shows the output signal from current comparator 12. Curve d shows the output signal from voltage comparator 13. The falling edge from the current comparator 12 turns off the upper switch transistor (with a slight time delay) and the rising edge from the voltage comparator 13 turns it on. Curves a, d and e also show the undesired ringing at the rising edge of voltage E. It is the purpose of the present invention to eliminate the ringing in curve e. It should be noted that also the ringing in waveforms a and d will be eliminated, when the ringing in waveform e has been eliminated.

FIG. 4 shows an identical case, however with negative inductor current. Curve a and b show similar signals as in FIG. 3, now with opposite polarities. Note that also Iref is negative. Curve c shows the output signal from current comparator 12. Curve d shows the output signal from voltage comparator 14. Here the rising edge from the current comparator 12 turns off the lower switch transistor and the rising edge from the voltage comparator 14 turns it on. Curves a, d and e also show the undesired ringing at the falling edge of voltage E.

Figure 5:
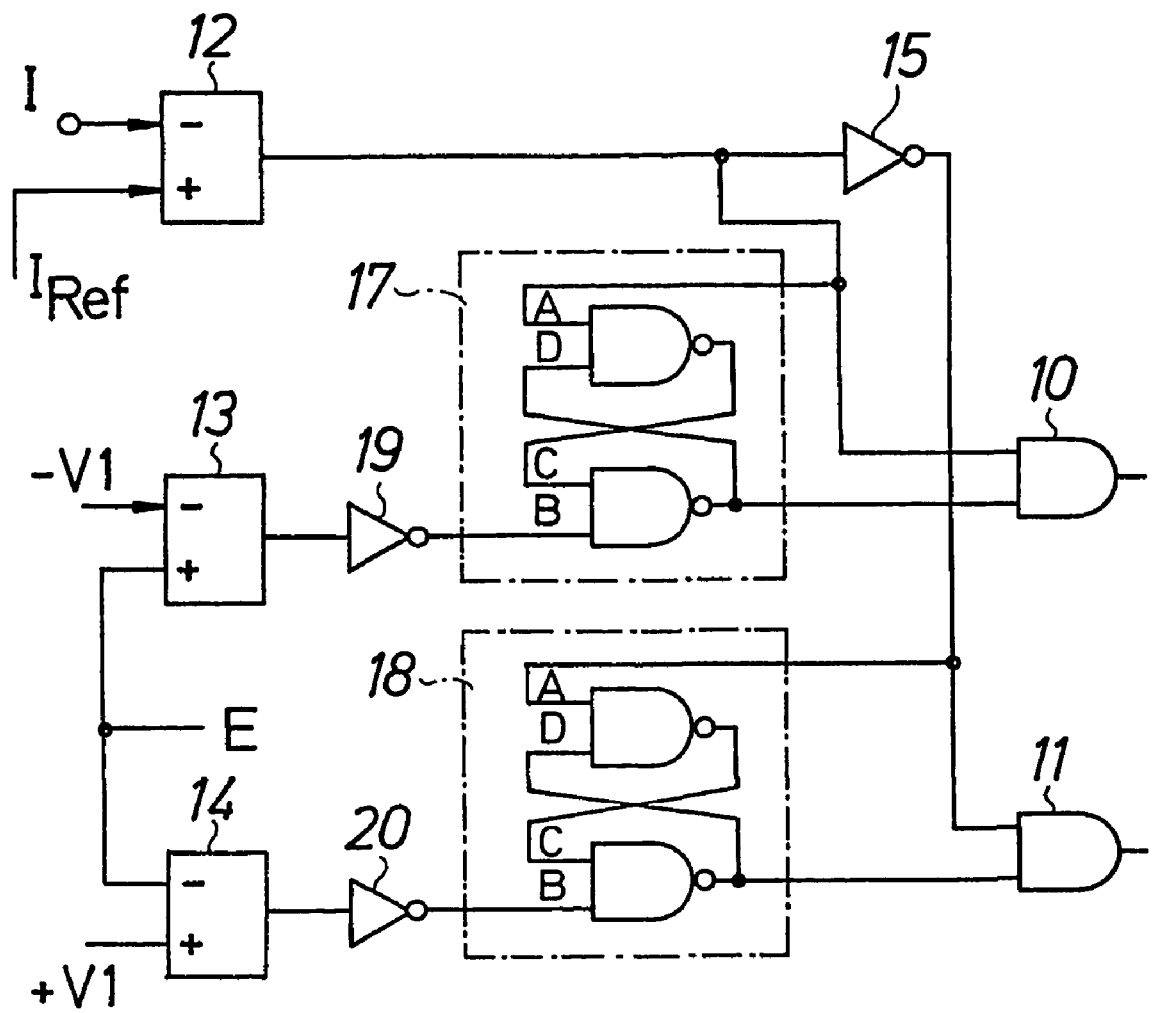
FIG. 5 shows a part of a control circuit according to one embodiment of the present invention.

FIG. 5 shows a circuit design according to the present invention to solve this problem. Two flip-flops 17 and 18 have been introduced and two inverters 19 and 20 are introduced to obtain the proper operation. As an alternative to the two inverters 19 and 20, the signs of the comparators 13 and 14 could have been reversed.

The function of the flip-flops 17 and 18 is similar to a JK flip-flop. A function table of the flip-flop is shown below. The main feature is that the flip-flop may be in two different states when both inputs are 1. The actual state depends on the previous state of the flip-flop, as shown by the two arrows. Thus, it is seen that this flip-flop does not change its outputs when going from a state in which one of the inputs was 1. The flip-flop acts as a memory for the last logical "0" pulse, either at input A or at input B. Such pulses are generated in a normal switch sequence from the current comparator 12 and the voltage comparators 13 and 14, as is seen from FIGS. 3 and 4.

| Flip-flop function table with inputs A, B and outputs C, D | | |
|---|---|---|
| | A = 0 | A = 1 |
| B = 0 | C = 1<br>D = 1 | C = 0<br>D = 1 |
| B = 1 | C = 1<br>D = 0 | → C = 1<br>D = 0    ↓ C = 0<br>D = 1 |

The states of the flip-flops 17 and 18 are set forth below for positive and negative switch cycles. The numbers in circles correspond to the states at the times indicated in FIGS. 3 and 4. It will be appreciated that the ringing in the signal E-comp does not affect the control signals from the AND gates 10 and 11. In this way it is avoided that the transistors are switched on and off, which would result in unnecessary power consumption.

Positive Switch Cycle

| A = I-comp, B = Inverse of E-comp | | |
|---|---|---|
| | A = 0 | A = 1 |
| B = 0 | C = 1 ② <br> D = 1 | C = 0 ① <br> D = 1 ⑤   ⑥ ↓↑↓↑ . . . |
| B = 1 | C = 1 ③ <br> D = 0 | → C = 1    ↓ C = 0 <br> ④ D = 0    D = 1 |

① On
② Off(I-comp goes to 0)
③ Off
④ Off
⑤ Turned on
⑥ Ringing. Inverse E-comp goes →0→1→0 . . . but switch is not effected but still on.
⑦ When inverse E-comp is stable (=0), then ⑦ = ① and the process is repeated.

Negative Switch Cycle

| A = Inverse of I-comp, B = Inverse of E-comp | | |
|---|---|---|
| | A = 0 | A = 1 |
| B = 0 | C = 1 ② <br> D = 1 | C = 0 ① <br> D = 1 ⑤   ⑥ ↓↑↓↑ . . . |

-continued

A = Inverse of I-comp, B = Inverse of E-comp

|  | A = 0 |  | A = 1 |  |
|---|---|---|---|---|
| B = 1 | C = 1 ③ | → C = 1 | ↓ C = 0 |  |
|  | D = 0 | ④ D = 0 | D = 1 |  |

① On
② Off(Inverse of I-comp goes to 0)
③ Off
④ Off
⑤ Turned on
⑥ Ringing. Inverse E-comp goes →0→1→0 . . . but switch is not effected but still on.
⑦ When inverse E-comp is stable (=0), then ⑦ = ① and the process is repeated.

A device with the same function may also be implemented by means of other hardware devices or by means of software, e.g. with a micro processor or a digital signal processor (not shown). The logic function is emulated by programming the digital processor such that the output equals the above function table.

Naturally, all possible combinations of power and signal components can be used, also if all combinations are not mentioned here.

The invention claimed is:

1. Means for controlling a power supply circuit for providing electric power to a load (7), comprising: a power supply stage having an LC circuit with an inductor (4) and filter capacitors (5) and (6), and a control stage for creating a special switch sequence, wherein the power supply stage comprises a bridge circuit (1) including two semiconductor members (2, 3) connected in series between positive (+V0) and negative (−V0) power supply rails, each semiconductor member comprising a switchable member for conducting current to or from the load (7) in the forward direction of the semiconductor member under control of a control drive circuit, with a free-wheel diode connected in parallel with the switchable member for conduction of current in the opposite direction;
   wherein the control stage comprises a monitor circuit for monitoring the bridge voltage (E) of the connection between the two semiconductor members (2), (3) and the current (I) through the inductor (4), said monitor circuit comprising a first comparator (12) for comparing when the current (I) through the inductor exceeds a reference value (Iref) and a second comparator (13, 14) for comparing when the bridge voltage (E) changes polarity towards the corresponding rail polarity;
   a drive circuit adapted to provide a firing pulse to one of said switchable members of said semiconductor members for initiating the conduction thereof;
   said drive circuit being adapted to terminate the conduction of said switchable member when said first comparator (12) determines that the current (1) through the inductor exceeds said reference value (Iref), and to provide another firing pulse when said second comparator (13, 14) determines that the bridge voltage (E) changes polarity towards the corresponding rail polarity, characterised by a logic circuit incorporated in the monitor circuit and connected to the outputs of the first (12) and second comparators (13, 14), said logic circuit being adapted to respond to the first firing edge of a signal from the second comparator (13, 14) only, when the signal from the first comparator (12) permits firing.

2. A control means in accordance with claim 1, characterised in that the logic circuit comprises a flip-flop circuit.

3. A control means in accordance with claim 2, characterised in that the logic circuit comprises two flip-flop circuits, one for the respective positive and negative sides.

4. A control means in accordance with claim 1, characterised in that the logic circuit comprises a digital micro controller or a digital signal processor.

* * * * *